US010448192B2

(12) United States Patent
Shenoy et al.

(10) Patent No.: US 10,448,192 B2
(45) Date of Patent: *Oct. 15, 2019

(54) APPARATUS AND METHOD OF AUDIO STABILIZING

(71) Applicant: Nokia Technologies Oy, Espoo (FI)

(72) Inventors: Ravi Shenoy, Bangalore (IN); Pushkar Prasad Patwardhan, Thane (IN); Miikka Vilermo, Siuro (FI); Kemal Ugur, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,079

(22) Filed: Jun. 25, 2018

(65) Prior Publication Data

US 2018/0310117 A1    Oct. 25, 2018

Related U.S. Application Data

(63) Continuation of application No. 14/362,663, filed as application No. PCT/FI2012/051209 on Dec. 5, 2012, now Pat. No. 10,009,706.

(30) Foreign Application Priority Data

Dec. 7, 2011    (IN) ............ 4248/CHE/2011

(51) Int. Cl.
*H04S 7/00*    (2006.01)
*H04N 5/232*    (2006.01)
*H04N 5/91*    (2006.01)
*H04S 1/00*    (2006.01)
*H04R 1/40*    (2006.01)

(52) U.S. Cl.
CPC ............ *H04S 7/307* (2013.01); *H04N 5/232* (2013.01); *H04N 5/91* (2013.01); *H04R 1/406* (2013.01); *H04S 1/002* (2013.01); *H04S 1/005* (2013.01); *H04S 2400/15* (2013.01); *H04S 2420/01* (2013.01)

(58) Field of Classification Search
USPC .................................................. 386/239–262
See application file for complete search history.

(56) References Cited

U.S. PATENT DOCUMENTS

| 5,687,239 A | 11/1997 | Inanaga ........................ 381/17 |
| 5,973,733 A | 10/1999 | Gove ...................... 348/208.13 |
| 2003/0227476 A1 | 12/2003 | Wilcock ....................... 715/727 |
| 2004/0155968 A1 | 8/2004 | Cheatle ................... 348/207.99 |
| 2005/0147261 A1 | 7/2005 | Yeh ................................ 381/92 |
| 2006/0170783 A1 | 8/2006 | Stavely et al. ............. 348/208.6 |

(Continued)

FOREIGN PATENT DOCUMENTS

| EP | 0676899 A2 | 10/1995 |
| EP | 2257943 A2 | 8/2010 |

(Continued)

OTHER PUBLICATIONS

Deo, S. et al., "Experiments in Spatial Mobile Audio-Conferencing", in proc. Int. Conference on mobile technology, Applications and Systems, Sep. 2007, pp. 447-451, Singapore.

*Primary Examiner* — Hung Q Dang
(74) *Attorney, Agent, or Firm* — Harrington & Smith

(57) ABSTRACT

A method comprising determining a spatial audio signal; determining an apparatus motion parameter; and stabilizing the spatial audio signal dependent on the apparatus motion parameters.

20 Claims, 10 Drawing Sheets

(56) References Cited

U.S. PATENT DOCUMENTS

| | | |
|---|---|---|
| 2007/0009120 A1 | 1/2007 | Algazi et al. |
| 2008/0243278 A1 | 10/2008 | Dalton et al. |
| 2009/0028347 A1 | 1/2009 | Duraiswami ................... 381/25 |
| 2010/0128892 A1 | 5/2010 | Chen et al. ..................... 381/92 |
| 2010/0150355 A1 | 6/2010 | Kon ............................... 381/17 |

FOREIGN PATENT DOCUMENTS

| | | |
|---|---|---|
| EP | 2342290 A1 | 8/2011 |
| WO | WO-2006/103581 A1 | 10/2006 | ative motion while they
APPARATUS AND METHOD OF AUDIO STABILIZING

CROSS-REFERENCE TO RELATED APPLICATIONS

This application is a continuation of U.S. application Ser. No. 14/362,663, filed on Jun. 4, 2014, which was originally filed as PCT Application No. PCT/FI2012/051209 filed on Dec. 5, 2012, which claims priority to IN application 4248/CHE/2011 filed on Dec. 7, 2011, the disclosures of which are incorporated by reference in their entireties.

FIELD

The present application relates to apparatus for the processing and stabilizing of audio signals. The application further relates to, but is not limited to, portable or mobile apparatus for processing and stabilizing audio signals from mobile devices.

BACKGROUND

The capture or recording of audio or audio video content is well known. Many handheld devices are equipped with both cameras and microphones configured to capture or record audio and/or audio video signals for storage or transmission. Furthermore such devices are more commonly being equipped with spatial audio capture technology. Spatial audio capture technology uses an array of microphones (two or more) for recording or capturing the audio environment. The captured audio signals are analysed to extract the spatial co-ordinates/positions of any relevant or dominant sources in the captured audio environment. The spatial co-ordinates can then be defined with regards or reference to the orientation of the capturing device and typically the orientation of the centre of the camera viewpoint. Typically the spatial co-ordinates of the audio sources relative to the orientation of the electronic device are in the form of an angle with respect to a device centre axis or axes defined by the camera orientation. These coordinates are then used in some situations to synthesize a stereo audio signal at a listening device. The synthesis involves imparting frequency and angle dependent inter aural time and level difference cues through a head related transfer function (HRTF) or head related impulse response (HRIR). These combinations of HRTF/HRIR values when replayed on a stereo headphone set allow the signal to represent an audio sound field which is perceptually similar to the recorded audio environment. Alternatively synthesis based on custom panning rules can be applied for replaying it on a multi-channel loudspeaker set up.

Often the presentation of spatial audio signals is performed in conjunction with a replay of a video feed captured by a camera on the device.

Such portable devices unlike tripod mounted apparatus are prone to translational and rotational motion while they are recording audio and video. These motions can be the result of motion of the person holding the device (produced such as by device 'shake', or movement such as walking, running, and changing hands), or by the motion of a vehicle on which the device is mounted while recording. The motion is unintentional and unavoidable but can result in an unpleasant video playback experience. Video stabilization to overcome such translational and rotational values for video in many commercially available video recorders as this motion is typically constrained to relatively small translational and rotational values.

The recorded audio signal is similarly affected by motion. Specifically any motion could generate an incorrect estimate of the positions of the sources in the audio environment. Furthermore the estimation could further assign an audio source an incorrect motion. For example stationary sources at a given coordinate would when affected by motion can lead to variations in the estimated positions which causes the replayed sound sources to 'oscillate' or 'wobble' around their position whilst the video image maintained stationary.

SUMMARY

Aspects of this application thus provide audio source stabilization in recording audio signals.

There is provided according to the application a method comprising: determining a spatial audio signal; determining an apparatus motion parameter; and stabilizing the spatial audio signal dependent on the apparatus motion parameters.

The method may further comprise: capturing at least two video images at different time instances; determining from the at least two video images a video image motion value; and wherein determining an apparatus motion parameter comprises determining an apparatus motion parameter based on the video image motion value.

Determining from the at least two video images a video image motion value may comprise: determining at least two local motion values; and combining the at least two local motion values to generate the video image motion value.

Determining a spatial audio signal may comprise: capturing at least one audio signal; and determining from the at least one audio signal at least one audio signal source location relative to a capturing apparatus.

Stabilizing the spatial audio signal dependent on the apparatus motion parameters may comprise changing the at least one audio signal source location relative to the capturing apparatus dependent on the video image motion value.

Determining an apparatus motion parameter may comprise filtering the apparatus motion parameter to remove lower frequency values.

Determining the apparatus motion parameter may comprise: determining an apparatus motion value from a positional sensor.

The positional sensor may comprise at least one of: accelerometer, gyroscope, electronic compass, a satellite positional estimator.

Determining an apparatus motion parameter based on the video image motion value may comprise: converting the video image motion value into at least one of a translational motion parameter of the apparatus and a rotational motion parameter of the apparatus.

Stabilizing the spatial audio signal dependent on the apparatus motion parameters may comprise rotationally stabilizing the spatial audio signal based on the rotational motion parameter of the apparatus.

Stabilizing the spatial audio signal dependent on the apparatus motion parameters may comprise translationally stabilizing the spatial audio signal based on the translational motion parameter of the apparatus.

Translationally stabilizing the spatial audio signal based on the translational motion parameter of the apparatus may comprise translationally stabilizing the spatial audio signal dependent on the translational motion parameter of the apparatus being greater than a translational parameter threshold.

According to a second aspect there is provided an apparatus comprising at least one processor and at least one memory including computer code for one or more programs, the at least one memory and the computer code configured to with the at least one processor cause the apparatus to at least perform: determining a spatial audio signal; determining an apparatus motion parameter; and stabilizing the spatial audio signal dependent on the apparatus motion parameters.

The apparatus may further perform: capturing at least two video images at different time instances; determining from the at least two video images a video image motion value; and wherein determining an apparatus motion parameter comprises determining an apparatus motion parameter based on the video image motion value.

Determining from the at least two video images a video image motion value may cause the apparatus to perform: determining at least two local motion values; and combining the at least two local motion values to generate the video image motion value.

Determining a spatial audio signal may cause the apparatus to perform: capturing at least one audio signal; and determining from the at least one audio signal at least one audio signal source location relative to the apparatus.

Stabilizing the spatial audio signal dependent on the apparatus motion parameters may cause the apparatus to perform changing the at least one audio signal source location relative to the apparatus dependent on the video image motion value.

Determining an apparatus motion parameter may cause the apparatus to perform filtering the apparatus motion parameter to remove lower frequency values.

Determining the apparatus motion parameter may cause the apparatus to perform: determining an apparatus motion value from a positional sensor.

The positional sensor may comprise at least one of: accelerometer, gyroscope, electronic compass, a satellite positional estimator.

Determining an apparatus motion parameter based on the video image motion value may cause the apparatus to perform: converting the video image motion value into at least one of a translational motion parameter of the apparatus and a rotational motion parameter of the apparatus.

Stabilizing the spatial audio signal dependent on the apparatus motion parameters may cause the apparatus to perform rotationally stabilizing the spatial audio signal based on the rotational motion parameter of the apparatus.

Stabilizing the spatial audio signal dependent on the apparatus motion parameters may cause the apparatus to perform translationally stabilizing the spatial audio signal based on the translational motion parameter of the apparatus.

Translationally stabilizing the spatial audio signal based on the translational motion parameter of the apparatus may cause the apparatus to perform translationally stabilizing the spatial audio signal dependent on the translational motion parameter of the apparatus being greater than a translational parameter threshold.

According to a third aspect of the application there is provided an apparatus comprising: an audio capturer configured to determine a spatial audio signal; an apparatus motion determiner configured to determine an apparatus motion parameter; and an audio stabilizer configured to stabilize the spatial audio signal dependent on the apparatus motion parameters.

The apparatus may further comprise: a camera configured to capture at least two video images at different time instances; a video motion determiner configured to determine from the at least two video images a video image motion value; and wherein the apparatus motion determiner is configured to determine an apparatus motion parameter based on the video image motion value.

The video motion determiner may comprise: a local motion determiner configured to determine at least two local motion values; and a global motion determiner configured to combine the at least two local motion values to generate the video image motion value.

The audio capturer may comprise: at least one microphone configured to determine at least one audio signal; and a spatial audio signal determiner configured to determine from the at least one audio signal at least one audio signal source location relative to the apparatus.

The audio stabilizer may comprise a spatial audio signal processor configured to change the at least one audio signal source location relative to the apparatus dependent on the video image motion value.

The apparatus motion determiner may comprise a filter configured to filter the apparatus motion parameter to remove lower frequency values.

The apparatus motion determiner may comprise a sensor configured to determine an apparatus motion value.

The sensor may comprise at least one of: accelerometer, gyroscope, electronic compass, a satellite positional estimator.

The video motion determiner may comprise: a converter configured to convert the video image motion value into at least one of a translational motion parameter of the apparatus and a rotational motion parameter of the apparatus.

The audio stabilizer may comprise a rotational stabilizer configured to rotationally stabilize the spatial audio signal based on the rotational motion parameter of the apparatus.

The audio stabilizer may comprise a translational stabilizer configure to translationally stabilize the spatial audio signal based on the translational motion parameter of the apparatus.

The translational stabilizer may comprise a translation significance determiner configured to enable the translational stabilizer to translationally stabilize the spatial audio signal dependent on the translational motion parameter of the apparatus being greater than a translational parameter threshold.

According to a fourth aspect of the application there is provided an apparatus comprising: means for determining a spatial audio signal; means for determining an apparatus motion parameter; and means for stabilizing the spatial audio signal dependent on the apparatus motion parameters.

The apparatus may further comprise: means for capturing at least two video images at different time instances; means for determining from the at least two video images a video image motion value; and wherein the means for determining an apparatus motion parameter comprises means for determining an apparatus motion parameter based on the video image motion value.

The means for determining from the at least two video images a video image motion value may comprise: means for determining at least two focal motion values; and means for combining the at least two local motion values to generate the video image motion value.

The means for determining a spatial audio signal may comprise: means for capturing at least one audio signal; and means for determining from the at least one audio signal at least one audio signal source location relative to a capturing apparatus.

The means for stabilizing the spatial audio signal dependent on the apparatus motion parameters may comprise means for changing the at least one audio signal source location relative to the capturing apparatus dependent on the video image motion value.

The means for determining an apparatus motion parameter may comprise means for filtering the apparatus motion parameter to remove lower frequency values.

The means for determining the apparatus motion parameter may comprise: means for determining an apparatus motion value from a positional sensor.

The positional sensor may comprise at least one of: accelerometer, gyroscope, electronic compass, a satellite positional estimator.

The means for determining an apparatus motion parameter based on the video image motion value may comprise: means for converting the video image motion value into at least one of a translational motion parameter of the apparatus and a rotational motion parameter of the apparatus.

The means for stabilizing the spatial audio signal dependent on the apparatus motion parameters may comprise means for rotationally stabilizing the spatial audio signal based on the rotational motion parameter of the apparatus.

The means for stabilizing the spatial audio signal dependent on the apparatus motion parameters may comprise means for translationally stabilizing the spatial audio signal based on the translational motion parameter of the apparatus.

The means for translationally stabilizing the spatial audio signal based on the translational motion parameter of the apparatus may comprise means for translationally stabilizing the spatial audio signal dependent on the translational motion parameter of the apparatus being greater than a translational parameter threshold.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which.

EMBODIMENTS OF THE APPLICATION

The following describes in suitable apparatus and possible mechanisms for the provision of effective audio stabilization. In the following examples audio signals and audio capture stabilization is described as part of an audio and video capture apparatus.

The concept described herein is related to assisting in audio recording or process capture and an associated audio presentation process. Furthermore although the following examples are described with regards to the camera or video capture apparatus generating sensor data for committing or enabling audio stabilization to occur it would be understood that in some embodiments other sensor data such as compass data, gyroscope data or accelerometer data can be used to produce suitable motion vector values or assist in the generation of suitable motion vectors values. Similarly in some embodiments sensor data from positional and/or orientation estimation such as estimated motion using satellite signals can similarly be used.

Figure 8:
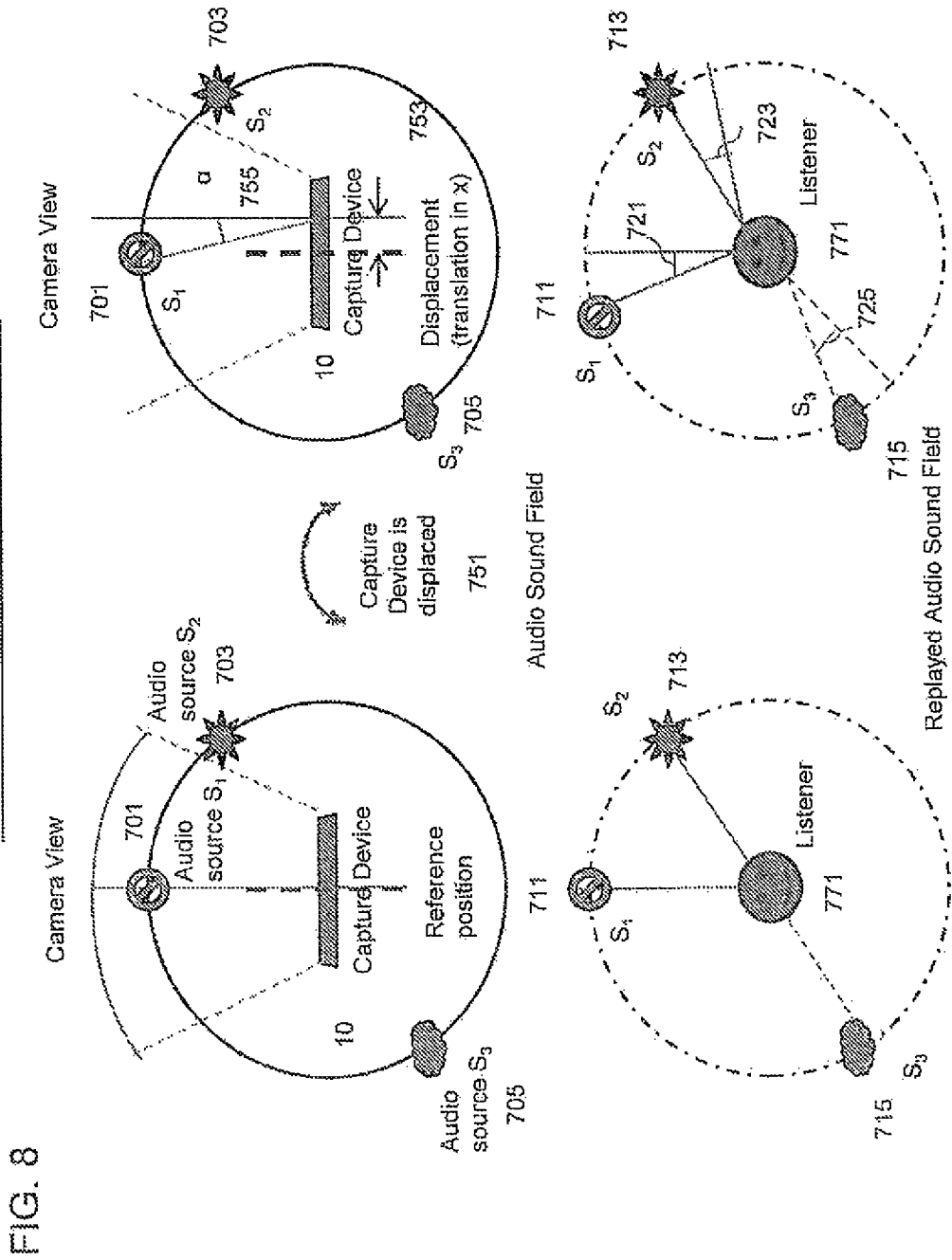
FIG. 8 shows an example showing audio capture translational motion source positioning estimation errors.

With respect to FIG. 8 an example translational motion error effect is shown where the recording or capture apparatus experiences a translational displacement which produces an error in a replayed audio sound field. The capture device or apparatus 10 is shown as the centre of the capture environment shown in the top half and the listening or replaying apparatus configured to generate the synthesised audio signal is shown in the bottom half. The stationary example being the left half and the translational move example the right half of FIG. 8. The capture device or apparatus 10 defines a reference position and direction, the direction being defined by the 'line' at the centre of the camera view in the static example. The camera is pointing or directed at the first audio source 701 $S_1$. In this example a second audio source 703 $S_2$ is located, at approximately 45 degrees and to the right (45 R) of the capture device 10 at and a third audio source 705 $S_3$ is located approximately at 135 degrees to the left (135 L) of the capture device reference direction 10.

The capturing of these audio sources can be processed in such a way that the audio signals when processed and synthesised for the listener device 771 the first synthesised audio source $S_1$ 711 is located directly ahead of the listener, the second synthesised audio source $S_2$ 713 is located at approximately 45 degrees and to the right of the listener and the third audio source 715 $S_3$ is located at approximately 135 degrees and to the left of the listener at the locations and in line with the determined audio source locations.

As is shown in the right hand side of FIG. 8 the capture device can be displaced as shown by the arrow 751 generating synthesised audio sound fields with an error value. The capture device 10 displacement, the translation in the x direction 753, is such that the camera view or reference direction of the device is no longer in line with the first audio sources, 701. In other words, there is a noticeable angle between the camera view reference position (direction) and the first audio source $S_1$ 701. Furthermore the displacement or translation (x) has a similar effect with regards to the second audio source 703 and the third audio source 705. This displacement 753 can for example cause a rotational angle error α 755 defining an angle between the reference direction and the first audio source 701 $S_1$ following the displacement.

This error furthermore is shown in the synthesised replayed audio sound field by a similar rotational error shown in the direction of the synthesised first 711 $S_1$, second 713 $S_2$ and third 715 $S_3$ audio sources in the replayed audio sound field from the expected position. In other words the first synthesized audio source $S_1$ 712 has a first angle error 721 the second synthesized audio source has a second angle error 723 and the third synthesized audio source has a third angle error 725. It would be understood that where the audio signal sources are far field (where the displacement distance is much smaller than the distance between the source and the apparatus) then the errors will be substantially the same, however for the field audio signal sources the errors will differ dependent on the distance to the source from the capture apparatus.

Figure 9:
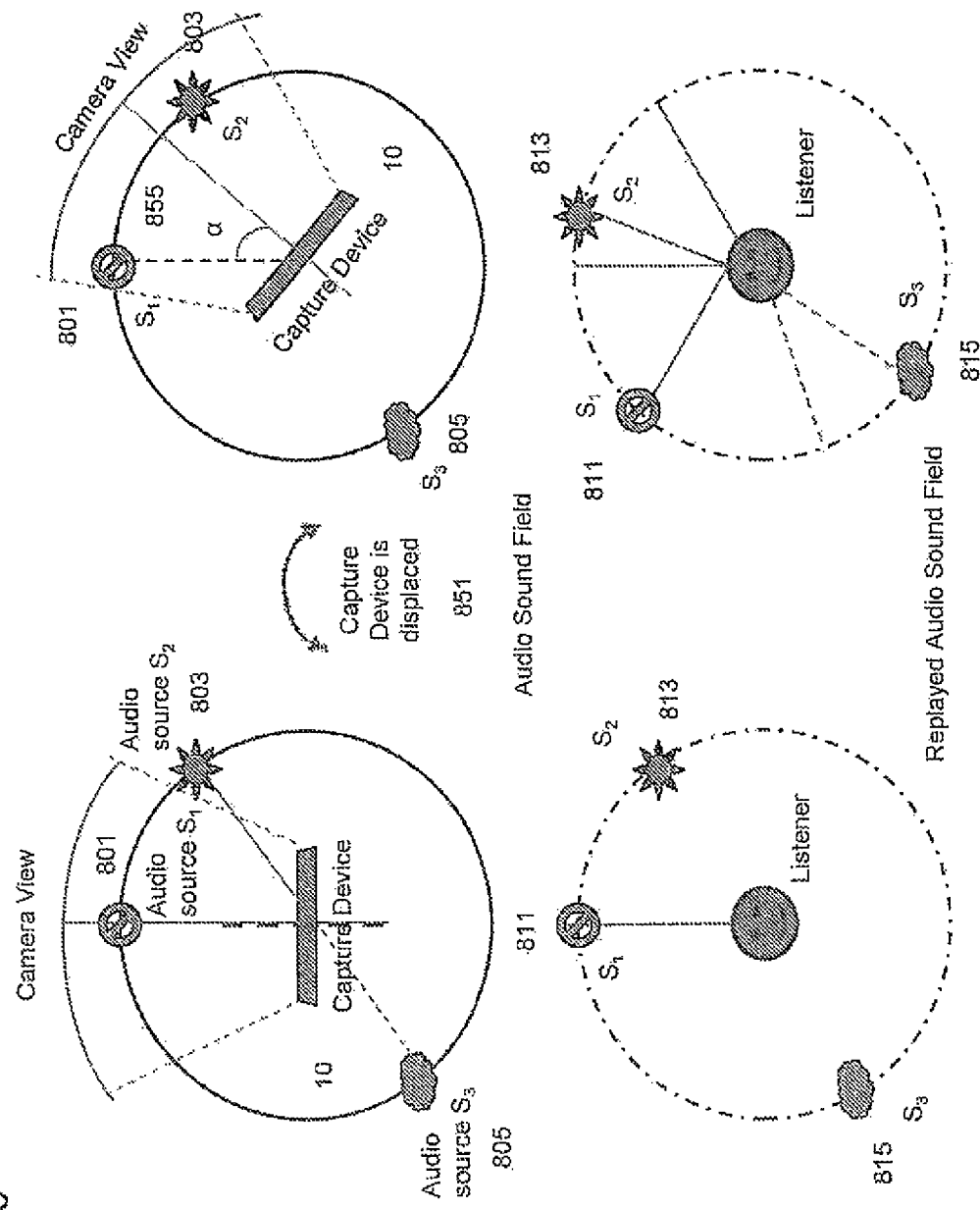
FIG. 9 shows an example showing audio capture rotational motion source positioning estimation errors.

With respect to FIG. 9 an example rational motion error caused by a capture device rotation is shown. The FIG. 9 a shows on the left hand side the stationary example and on the right hand side the rotational motion effected example similarly to FIG. 8 with a capture or recording device 10 with reference direction and the first audio source $S_1$ 801 (at approximately 0 degrees), second audio source $S_2$ 803 (at approximately 45° R) and the third audio source $S_3$ 805 (at approximately 135 degrees L) represented in the bottom half showing the synthesized audio sound field with the first synthesized audio source $S_1$ directly in front of the listener (0 degrees) the second synthesized $S_2$ 813 to the right (45 degrees R) of the listener and the third synthesized audio source $S_3$ 815 to the left (135 degrees L) of the listener.

The example rotational angle 855 of the capture device causes the perceived reference direction to move (approximately 30 degrees shift right) with respect to the first (and other) audio sources as shown in the right hand side of FIG. 9 this motion produces a rotational angle (approximately 30 degrees right in this example) 855 with respect to the perceived direction of the audio sources $S_1$ $S_2$ and $S_3$ and their original direction. This would in this example cause the apparatus to produce an error estimate which would be propagated within the replayed audio sound field where the audio sources "shift" with respect to the listeners position such that in this example the first synthesized audio source 811 is now experienced approximately at 30 degrees L, the second synthesized audio source 813 is experienced near to the centre (15 degrees R) and the third synthesized audio source $S_2$ experienced almost behind the listener (175 degrees L).

Figure 1:
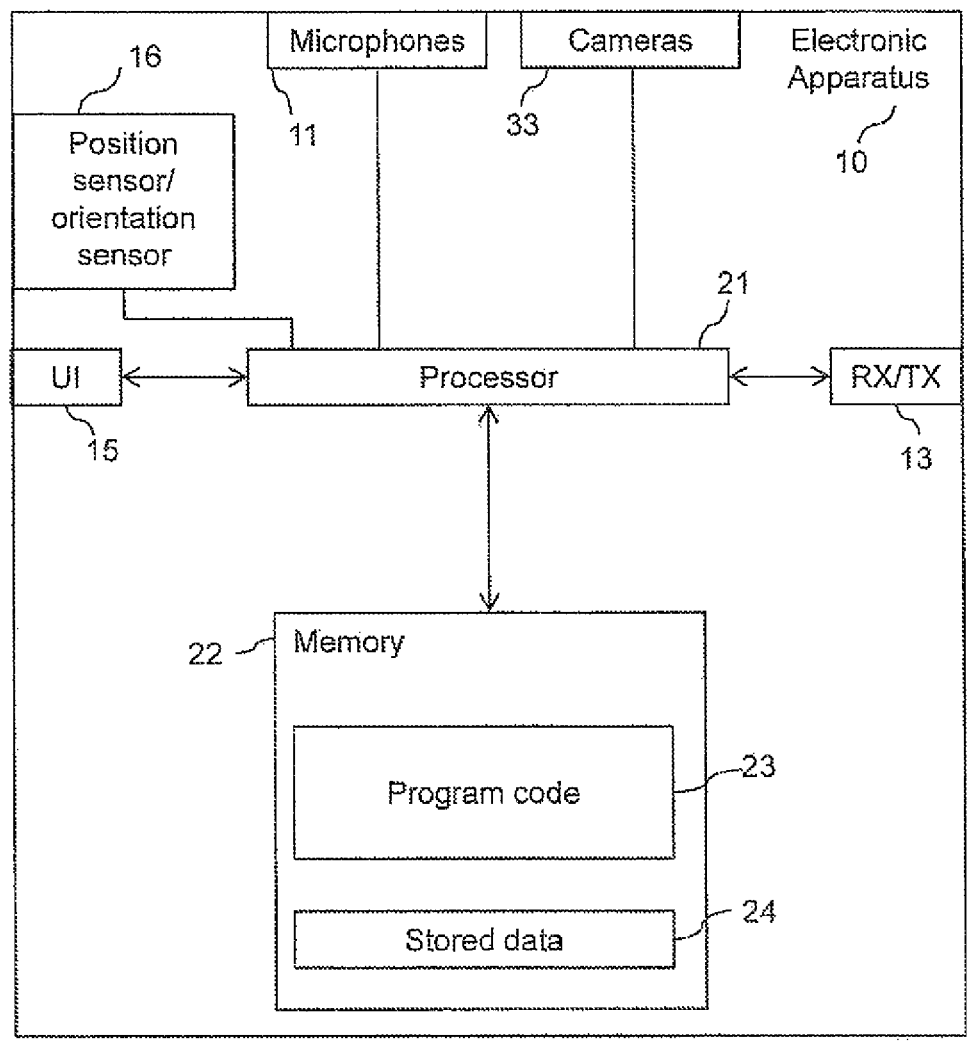
FIG. 1 shows schematically an apparatus or electronic device suitable for implementing some embodiments.

FIG. 1 shows a schematic block diagram of an exemplary apparatus or electronic device 10, which may be used to record or capture audio and/or audio video data.

The electronic device 10 may for example be a mobile terminal or user equipment of a wireless communication system. In some embodiments the apparatus can be an audio player or audio recorder, such as an MP3 player, a media recorder/player (also known as an MP4 player), or any suitable portable device suitable for recording audio or audio/video camcorder/memory audio or video recorder.

The apparatus 10 can in some embodiments comprise an audio subsystem. The audio subsystem for example can comprise in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro-electrical-mechanical system (MEMS) microphone. The microphone 11 or array of microphones can in some embodiments output the audio captured signal to an analogue-to-digital converter (ADC).

In some embodiments the apparatus can further comprise an analogue-to-digital converter (ADC) configured to receive the analogue captured audio signal from the microphones and outputting the audio captured signal in a suitable digital form. The analogue-to-digital converter can be any suitable analogue-to-digital conversion or processing means.

In some embodiments the apparatus 10 audio subsystem further comprises a digital-to-analogue converter for converting digital audio signals from a processor 21 to a suitable analogue format. The digital-to-analogue converter (DAC) or signal processing means can in some embodiments be any suitable DAC technology.

Furthermore the audio subsystem can comprise in some embodiments a speaker. The speaker can in some embodiments receive the output from the digital-to-analogue converter and present the analogue audio signal to the user. In some embodiments the speaker can be representative of a headset, for example a set of headphones, or cordless headphones.

Although the apparatus 10 is described having both audio capture and audio presentation components, it would be understood that in some embodiments the apparatus 10 can comprise the audio capture or recording parts of the audio subsystem only such that in some embodiments the microphones (for audio capture) and/or ADC are present only.

In some embodiments the apparatus 10 comprises a processor 21. The processor 21 is coupled to the audio subsystem and specifically in some examples the analogue-to-digital converter for receiving digital signals representing audio signals from the microphones 11. The processor 21 can be configured to execute various program codes. The implemented program codes can comprise for example audio stabilization routines.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position or orientation sensor 16 configured to estimate the position of the apparatus 10. The position sensor 16 can, in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, a gyroscope or be determined by the motion of the apparatus using the positioning estimate.

In some embodiments the apparatus comprises a visual imaging subsystem. The visual imaging subsystem can in some embodiments comprise at least one camera configured to capture image data. The at least one camera can comprise a suitable lensing or image focus element configured to focus an image on a suitable image sensor. In some embodiments the image sensor can be further configured to output digital image data to processor 21.

It is to be understood again that the structure of the electronic device 10 could be supplemented and varied in many ways.

Figure 2:
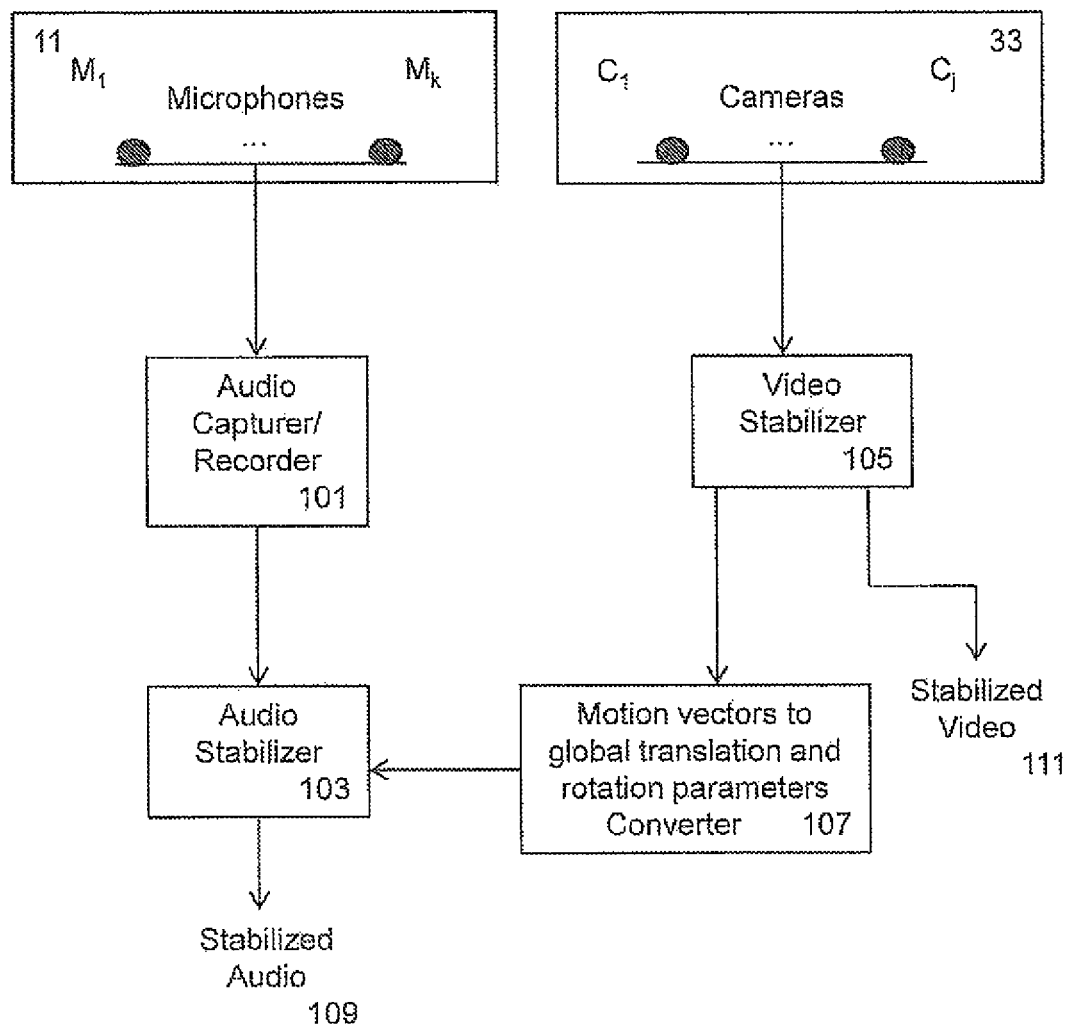
FIG. 2 shows schematically the audio stabilization apparatus according to some embodiments.

With respect to FIG. 2 a schematic view of an example electronic device or apparatus 10 suitable for implementing audio stabilization according to some embodiments is shown. Furthermore with respect to FIG. 3 an overview operation of the apparatus shown in FIG. 2 is described.

The apparatus concept uses motion parameters separated from video stabilization or video coding to assist in audio stabilization. These motion parameters can be converted into rotational and translational parameters using geometric transformations. The derived rotational and translational parameters can be in some embodiments filtered to differentiate between intended motion and unintended motion suitable for stabilization. The captured spatial audio can then be compensated for these motions.

In some embodiments as discussed herein the apparatus 10 can comprise a microphone 11 arrangement which includes a microphone array. The microphone arrangement or array can be configured to capture the acoustic waves and convert or generate suitable electrical audio signal representations of the captured acoustic waves. In the example shown in FIG. 2 the microphone array is shown as including k microphones (microphone $M_1$ to microphone $M_k$). The microphones shown in FIG. 2 are configured to output the microphone data to an audio capturer or recorder 101.

Figure 3:
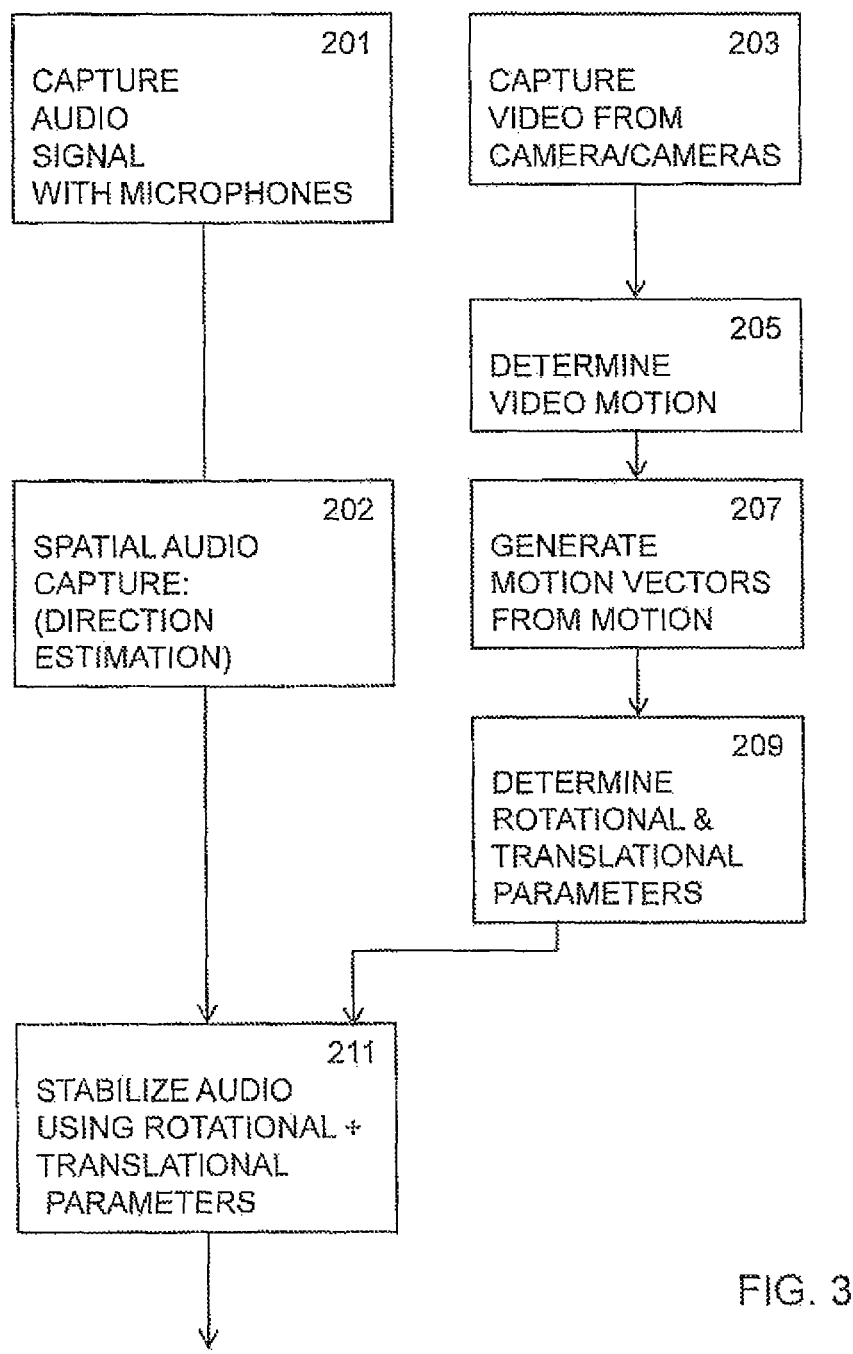
FIG. 3 shows a flow diagram of the operation of the audio stabilization apparatus as shown in FIG. 2 according to some embodiments.

With respect to FIG. 3 the operation of capturing the audio signal with microphones is shown in step 201.

In some embodiments the apparatus comprises an audio capturer/recorder 101. The audio capturer/recorder 101 can be configured in some embodiments to process the microphone data to determine a spatial audio signal.

For example in some embodiments a spatial audio signal can include one audio channel signal and additional audio parameters which can then be used to artificially manipulate the single audio channel signal to form a two or more channel audio signals. In other words the audio capturer/recorder spatial audio signal is produced by signal processing which can determine or generate an audio signal which at some point later can be configured to restore multiple audio channels by using a stereo widening effect from a single audio signal.

The signal processing techniques can for example be the introduction of one or more of: ITD (interaural time difference), IPD (interaural phase difference), and IID (interaural intensity difference) values. It would be understood that in some embodiments other suitable signal processing techniques using different audible cues can be implemented.

In some embodiments the audio signals are provided by recording or capturing the acoustic waves at more than one microphone to generate at least two audio signals generated from different microphone or microphone output combinations. For example where at least two channel audio signals are required for playback of spatial audio signals (for example for playback within headsets or even loudspeakers) and the apparatus is configured to generate these audio signals representing the acoustic signal defining the sound field (the sound field itself being defined by one or more sound sources), then at least two microphone audio signals are provided to the processor.

In some embodiments the audio capturer can be configured to determine estimated audio source directions or orientations with respect to the apparatus based on the audio signals generated or determined by the microphones. In some embodiments the audio capturer/recorder 101 comprises an analogue-to-digital converter (ADC) to convert the analogue output from the microphones into a suitable digital format for processing.

Figure 4:
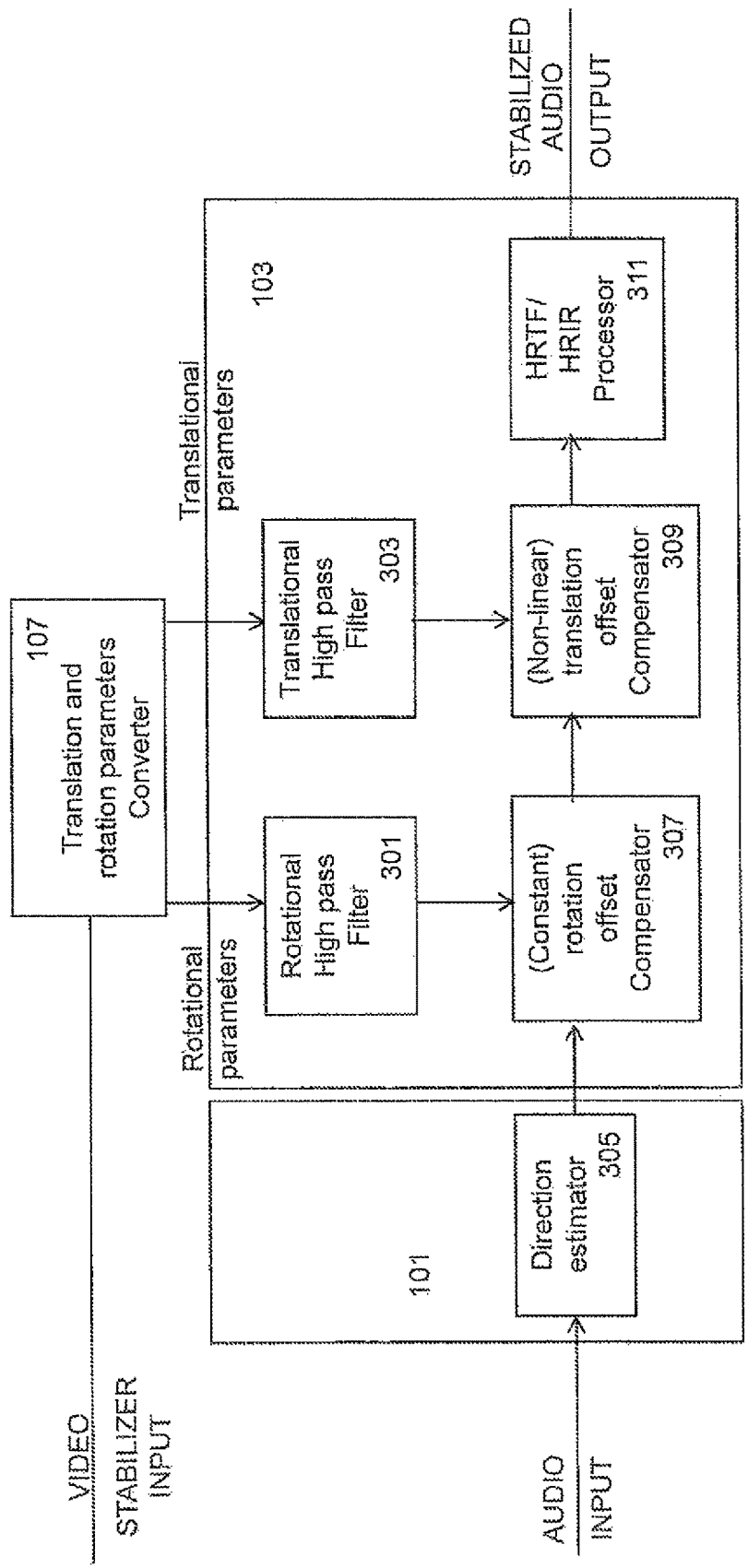
FIG. 4 shows schematically the audio stabilization apparatus in further detail according to some embodiments.

In some embodiments the audio capturer/recorder 101 can further be configured to receive the digital audio signal from the audio sub-system arrangement. The audio capturer/recorder 101 can also be configured to perform any other suitable processing of the microphone data prior to the microphone data being passed to the audio stabilization apparatus 100. For example as shown in FIG. 4 in some embodiments the audio capturer/recorder 101 can't be configured to estimate audio source directions from the received audio signals. For example the audio capturer/recorder 101 can include a direction estimator 305.

In some embodiments the audio capturer/recorder 101 can be configured to perform spatial audio capture, in other words estimation of the direction of various audio sources.

Figure 7:
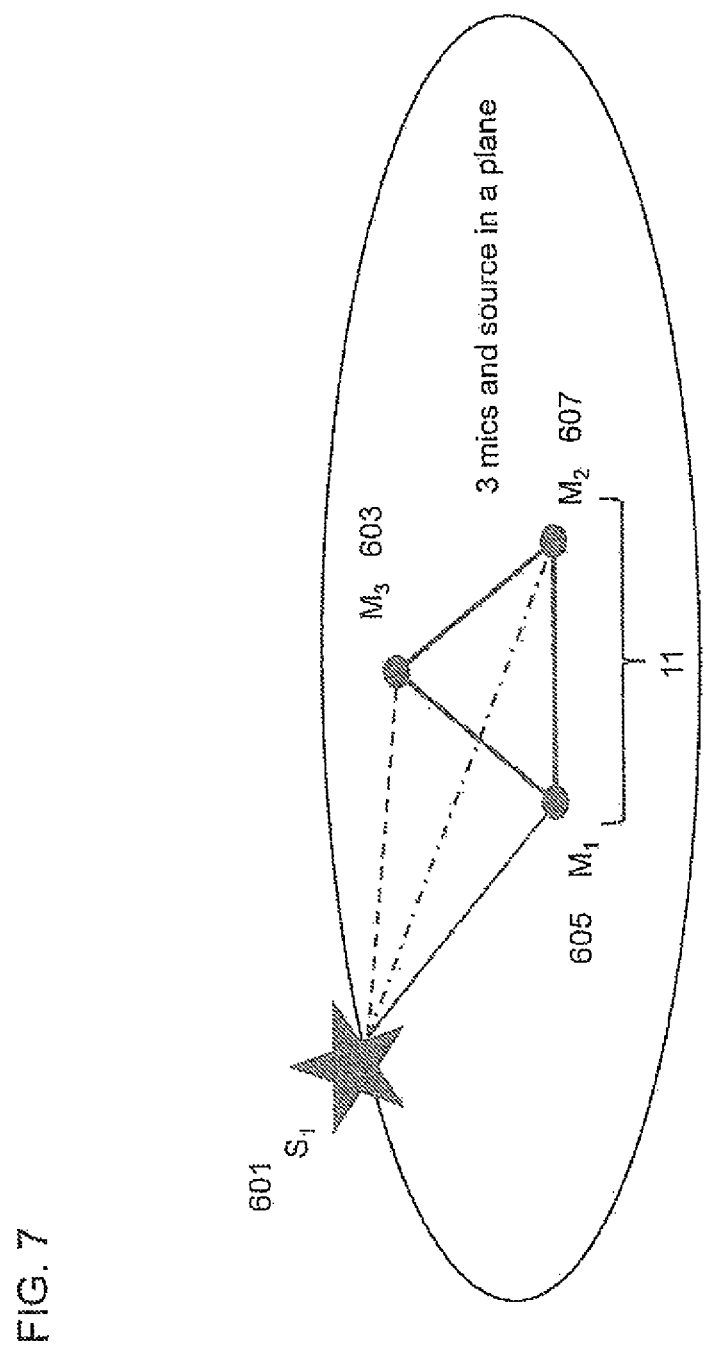
FIG. 7 shows an example geometry of spatial audio capture according to some embodiments.

Given three microphones in a plane it is possible to estimate the direction of a single source using geometry. FIG. 7 shows an example microphone placement whereby microphones are placed at the vertices of an equilateral triangle. As shown in FIG. 7 an equilateral triangle 11 is shown on which the first microphone 605 $M_1$, the second microphone $M_2$ 607, and the third microphone $M_3$ 603 are shown. Furthermore at any given point beyond a defined radius (for example ten times the length of any given side of the triangle) there is a unique set of distances to the three microphones. In other words the relative delays between the pairs of the microphones ($M_1$ and $M_2$, $M_2$ and $M_3$ and $M_1$ and $M_3$) for an acoustic wave emitted by an audio source bares a signature which is unique to that source direction.

The example source $S_1$ 601 and the delay path between the source $S_1$ 601 and the microphones $M_1$ $M_2$ and $M_3$ are also shown in FIG. 7.

Where there is more than one source active along various directions the audio capturer/recorder 101 and in some embodiments the direction estimator 305 can be configured to solve the problem of determining directions by performing source estimation for each sub band within a given time frame. In such examples a dominant source for each of the sub bands are determined and the direction associated with the source for each sub band is further determined. When the sources are moving the estimated directions have to be estimated at periodic intervals.

In some embodiments the direction estimator 305 can be configured to comprise a framer configured to receive the audio signals from each audio signal and generate frames or groups of sample data. The frame can for example be 20 ms long. In some embodiments the frames can overlap with neighbouring frames. For example each frame can overlap neighbouring frames by 10 ms. In some embodiments the frames are windowed with a suitable windowing function.

In some embodiments the direction estimator 305 further comprises a time to frequency domain transformer. The time to frequency domain transformer can be any suitable transformer configured to perform a suitable transformation on the time domain frames audio signals from each microphone from the microphone array. In some embodiments the transformation can be a discrete Fourier Transform (DFT), a discrete cosine transform (DCT), a modified discrete cosine transform (MDCT), a quadrature mirror filter (QMF) or similar.

In some embodiments the direction estimator 305 filter comprises a sub-band filter configured to receive the frequency domain signals from each microphone and divide these into sub-bands. The sub-bands can be in some embodiments discrete or overlapping. In some embodiments the sub-bands are determined by psychoacoustic experimentation or can be divided into linear or non-linear band distributions.

In some embodiments the direction estimator 305 comprises a correlator, configured to receive each sub-hand for at least pairs of microphones. Furthermore the correlator can be configured to determine the delay value which produces the largest correlation value for a microphone audio signal pair sub-band.

In some embodiments the direction estimator comprises a pairwise direction estimator configured from the correlator delay value to be configured to determine a direction for the dominant source signal for the sub-band being analysed. Furthermore in some embodiments, the pairwise direction estimator can be configured to compare each dominant source sub-band direction estimate to determine a direction for each source.

The spatial analysis therefore can be configured in some embodiments to estimate the direction of audio sources by this method. However it would be understood that correlation can be performed in the time domain and spatial analysis estimate audio source directions using the time domain correlation values.

Furthermore it would be understood that by offsetting microphones in elevation as well as azimuth then the elevation as well as azimuth positions can be estimated in some embodiments. Furthermore more accurate and front/back discrimination can be estimated by comparing different pairs of microphones to produce more than one estimate.

The operation of spatial audio capture is shown in FIG. 3 by step 202. The spatial directional estimates for each determined audio source can in some embodiments be passed to the audio stabilizer 103.

As discussed herein where the device or camera is in motion then the estimated audio direction source will be affected by this motion. Using the direction estimation it is not possible to resolve whether all of the sources are moving during the capture or if the capture device is itself in motion without having additional information. This ambiguity can be solved as discussed in some embodiments by motion sensors or by analysing the video. Motion sensors can clearly indicate camera motion quantitatively and implementation can be readily made by looking at the integrated motion sensors. In some embodiments the motion of the device is determined by the video stabilizer 105 as described herein.

The apparatus furthermore can comprise at least one camera 33 the at least one camera is shown in this example by an array of cameras $C_1$ to $C_j$. The camera output can be passed to a video stabilizer 105. The camera data can be in any suitable format.

The operation of capturing video from the camera or cameras is shown in FIG. 3 by step 203.

In some embodiments the apparatus comprises a video stabilizer 105. The video stabilizer can be configured to analyse the images received from the cameras 33 and determine image motion suitable to further perform video stabilization on the camera image data. The video stabilizer 105 can be configured to in some embodiments to perform global motion estimation.

In some embodiments the video stabilizer 105 can be configured to perform video motion estimation and compensation as part of a video coding standard such as mpeg4. The video stabilizer 105 motion estimation can in such embodiment compute or determine a localised motion vector for a block or macroblock of pixel data where neighbouring frames are analysed to provide information as to how much the macroblock is 'moved' to match an area in at least one of the neighbouring frames. The video stabilizer 105 and furthermore any motion estimation module in other words can in some embodiments as part of a video coding scheme generate several motion vector values for individual regions of the frame in the video. In some embodiments the video stabilizer can be configured to generate a global motion vector from the several local motion vectors. In some embodiments this can be determined by averaging the localised motion values across a frame. In some embodiments an outlier local motion vector value filter can furthermore be performed prior to averaging the localised motion values to reduce the effect of object motion errors within the apparatus caused motion estimation.

The determination of video motion is shown in FIG. 3 by step 205.

The global motion estimation can furthermore be used by the video stabilizer 105 the global motion is modelled as arising from the motion of the capture device or apparatus 10.

The global motion estimation therefore can in some embodiments be used to compensate for the motion be resynthesizing the later image frame to reduce the changes in the audio source 'movement' arising from the device motion. In some embodiments the global motion vector estimated parameters are passed to the motion vector to translational and rotation parameters convertor 107 to convert the global motion vector into translational, zoom and rotational motions of the camera. In some embodiments two successively captured image frames from the camera can then be analysed to estimate these parameters. However it would be appreciated that in some embodiments more than two captured image frames can be used.

Figure 6:
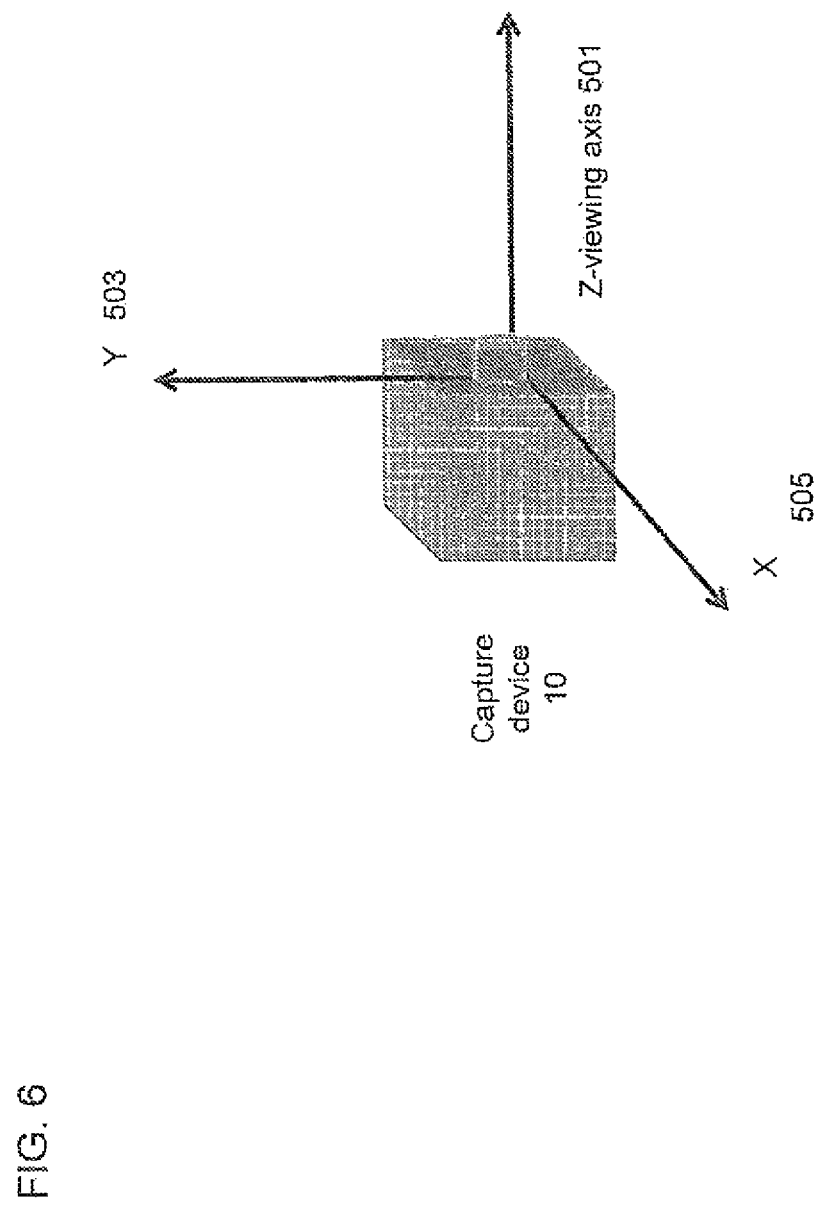
FIG. 6 shows schematically an example of a capture device or apparatus reference axes.

With respect to FIG. 6 an example capture apparatus and viewing motion axes are shown. The capture device 10 with the camera has a viewing axis defined by the Z or 'viewing' axis 501 and perpendicular to the viewing axis are the motion axes, the X-axis 505 and the Y-axis 503. It would be understood that types of motion can be further defined such as translational motion:

Track—moving left or right along the X axis
Boom—moving up or down along the Y axis
Dolly—moving forwards or backwards along the Z axis
Similarly rotational types of motion can be defined such as
Tilt—rotation about the X axis
Pan—rotation about the Y axis
Roll—rotation about the Z axis Furthermore the operation of generating motion vectors from the video motion is shown in FIG. 3 by step 207.

In some embodiments the apparatus comprises a motion vector to translation and rotation parameter converter 107 which can be configured to perform parameter estimation by modelling the motion as a parametric motion model. In such examples the intensity of a pixel at location x, y of a capture frame j is defined as $I_j(x,y)$. A subsequent frame pixel at the same location x, y has the intensity defined by $I_{j+1}(x, y)$. In some embodiments an affine transformation perspective model can be performed. The affine transformation perspective model requires eight parameters (a0, a7). The motion of the pixel from x to x' and y to y' is defined as $$x'=(a0+a2.x+a3.y)/(a6.x+a7.y+1)$$

$$y'=(a1+a4.x+a5.y)/(a6.x+a7.y+1)$$

The video converter 107 can then be configured to estimate the parameter values of a0 to a7 to minimise the error value, in other wise such that the sum of the squared or sum of the absolute deviation between $I_j(x, y)$ and $I_{j+1}(x', y')$ is minimised.

This for example is summarised in the following mathematical expression $$\min_{a0,a1\ldots a7} \sum \|I_j(x, y) - I_{j+1}(x', y')\|$$

It would be understood that the parameter estimation or conversion is mathematically under constrained and in some embodiments the converter 107 can solve this by implementing additional constraints such as defining a simpler affine, a pure translation or a translation zoom rotation constraint. These can mathematically represented by Simpler affine→a6=a7=0
Pure translation→a2=a5=1, a3=a4=a6=a7=0
Translation-zoom-rotation→a2=a5, a3=−a4, a6=a7=0

In some embodiments these constraints allow the converter 107 to for find the optimal solution that can be implemented in real time. The parameters of the parametric motion model can be used to determine the rotations and translations of the device.

The algorithms used to estimate the parameters are generally known and will not be described in detail further.

The converter can then be configured to output to the audio stabilizer 103 suitable motion estimation values for translation and rotation of the apparatus.

The operation of generating rotational and translational parameters is shown in FIG. 3 by step 209.

In some embodiments the apparatus comprises an audio stabilizer 103. The audio stabilizer can be configured to receive the audio captured (or recorded) information and the translation and rotation parameters to determine whether to apply audio stabilization and to apply audio stabilization to the audio source directional estimator where determined to be required.

With respect to FIG. 4 an example of the audio stabilizer 103 is shown in further detail. Furthermore with respect to FIG. 5 the operation of the audio stabilizer 103 as shown in FIG. 4 is shown.

The translational and rotational parameter converter 107 as described herein can be configured to generate translational and rotational parameters passed to the audio stabilizer 103.

Figure 5:
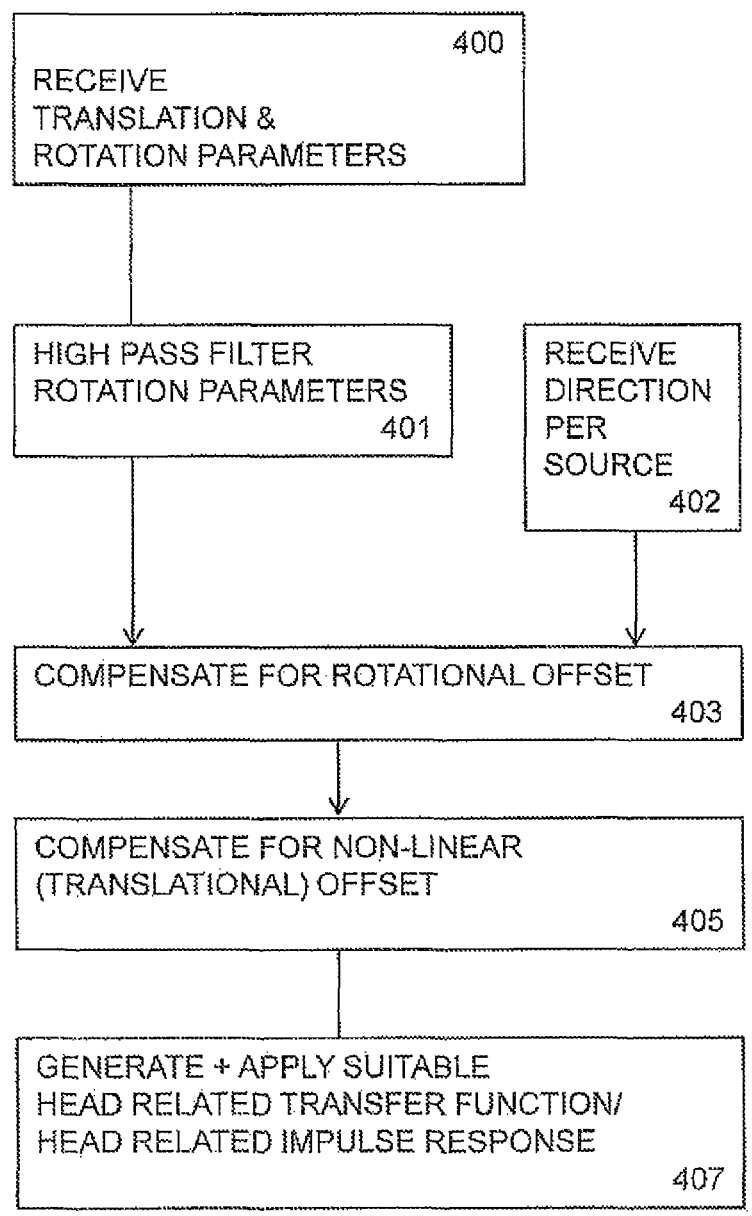
FIG. 5 shows a flow diagram of the operation of the audio stabilization apparatus in further detail as shown in FIG. 4 according to some embodiments.

The operation of receiving the translational and rotational parameters is shown in FIG. 5 by step 400.

Furthermore the audio stabilizer 103 can be configured to comprise in some embodiments a rotational high pass filter 301 configured to receive the rotational parameters and a translational high pass filter 303 configured to receive the translational parameters.

The rotational high pass filter 301 and the translational high pass filter 303 can be configured to high pass filter the rotational and translational parameters respectively in order to remove any intended motion which is mostly smooth and low frequency from the unintended or 'jerky' high frequency motion. The Rotational high pass filter 301 can therefore be configured to output filtered rotational parameters to a rotation offset compensator 307. The translational high pass filter 303 can be configured to output filtered translational parameters to a translational offset compensator 304.

The operation of high pass filtering the rotational and translational parameters are shown in FIG. 5 by step 401.

The directional estimator 305 can be configured to output directional estimations for each (audio band) audio source to the rotational offset compensator 307.

The operation of receiving the directional estimates for each source is shown in FIG. 5 by step 402.

In some embodiments the audio stabilizer 103 comprises a rotational offset compensator 307. The rotational offset compensator 307 is configured to receive the output of the rotational high pass filter 301 in the form of a rotational parameter estimating the rotation experienced by the apparatus and the directional estimations for each source from the directional estimator 305. The compensation performed by the rotational offset compensator 307 can be a constant offset for all of the angles of the estimated direction. In other words each of the determined sources are offset with the inverse of the filtered rotational parameter value.

The output of the rotational offset compensator 307 can then be passed to a (non-linear) translational offset compensator 309.

The operation of compensating for rotational offset is shown in FIG. 5 by step 403.

The audio stabilizer 103 in some embodiments comprises a translational (non-linear) offset compensator 309 can be configured to determine whether an offset is to be applied with regards to any translational error and to determine and apply an offset when required. The translational offset compensator 309 is configured to receive the output of the rotational offset compensator 307 and the high pass filtered translational parameters from the high pass filter 303.

The non-linear offset compensator 309 can be configured to perform compensation, depending on the type of motion.

Figure 10:
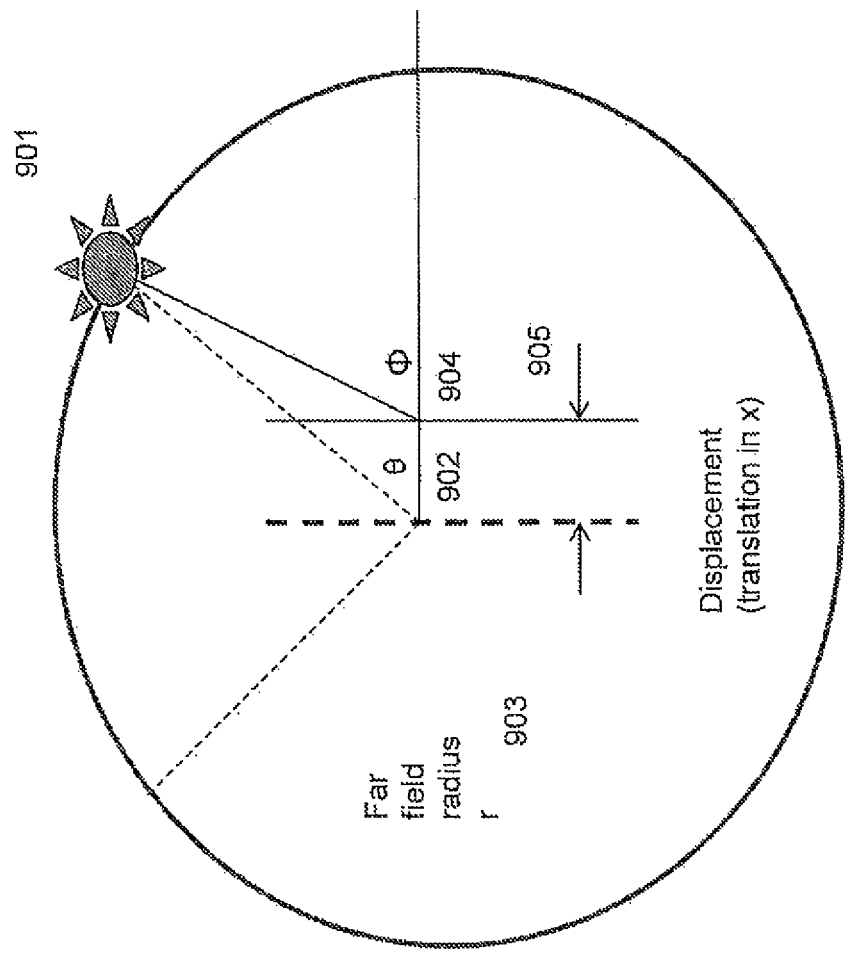
FIG. 10 shows an example translational motion compensation.

With respect to FIG. 10 an example the translational motion compensation is shown. The source 901 is originally determined with a first angle θ from the apparatus reference direction and is located at a radius r 903 from the apparatus. The application of the determined displacement translation in x 705 can lead to a new orientation φ 904 angle.

Mathematically these determination and offset application operations can be summarised as Where the original coordinates of source are defined by: r cos(θ)+j r sin(θ)

Let the displacement along x-axis be x.

The new angle (wrongly estimated because of displacement)

$$\phi = a\tan(r\sin(\theta)/(r\cos(\theta)-x))$$

In some embodiment the radius of the sources r can be defined as being the Far field radius, r as the value of the displacement x is typically small with respect to the value of r.

So θ can be computed by solving the above equation.

The operation of compensating for non-linear translational offset is shown in FIG. 5 by step 405

The output of the non-linear offset compensator 309 can then be passed to the HRTF or HRIR processor 311. In some embodiments the positional information or other stabilized spatial audio signal may be output or stored in memory. The output stabilized spatial audio signals can in some embodiments be processed by a further or listening device to regenerate the spatially stabilized audio signal which can be listened to by a user.

In some embodiments the apparatus comprises a HRTF/HRIR processor configured to select a set of HRTF/HRIR values for each audio source/sub-band depending on the positional estimate of each audio source/sub-band. These can be determined by a stored database or look up table. The HRTF/HRIR values for each can then be output to a listening device where they can be summed to create a synthesized audio signal.

The operation of generating and applying a suitable head related transfer function or head related impulse response per audio source/sub-band is shown in FIG. 5 by step 407.

In some embodiments the parameters for stabilization can be estimated using any other suitable sensor.

Furthermore the actual stabilization of audio signals can be performed using various means.

Although the above has been described with regards to audio signals, or audio-visual signals it would be appreciated that embodiments may also be applied to audio-video signals where the audio signal components of the recorded data are processed according to embodiments of the application.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   capturing, with an apparatus, at least two sensor data, where the at least two sensor data are related to an audio source;
   determining a location of the audio source;
   determining from the at least two sensor data a device motion value;
   deriving, based at least partially on the device motion value, at least one of:
      at least one rotational apparatus motion parameter, or
      at least one translational apparatus motion parameter;
   determining at least one of: a first offset based on the at least one rotational apparatus motion parameter or a second offset based on the at least one translational apparatus motion parameter; and
   stabilizing at least one spatial audio signal, where the at least one spatial audio signal relates to the determined location of the audio source, based at least partially on at least one of:
      compensating for rotational movement of the apparatus based on the first offset, or
      compensating for translational movement of the apparatus based on the second offset.

2. The method as in claim 1, further comprising presenting the stabilized at least one spatial audio signal to a user.

3. The method as claimed in claim 1, wherein stabilizing the at least one spatial audio signal comprises applying the first offset and/or the second offset to the determined location of the audio source.

4. The method as in claim 1, wherein deriving the at least one rotational apparatus motion parameter and/or the at least one translational apparatus motion parameter comprises filtering the at least one rotational apparatus motion parameter and/or the at least one translational apparatus motion parameter to remove higher frequency values.

5. The method as in claim 1, wherein determining the first offset comprises estimating an amount of the rotational movement of the apparatus based on the at least one rotational apparatus motion parameter, and estimating an angle of the determined location of the audio source following the rotational movement.

6. The method as in claim 5, wherein compensating for the rotational movement comprises applying the first offset to the estimated angle.

7. The method as claimed in claim 1, wherein determining the second offset comprises:
   determining a type of the translational movement of the apparatus based on the at least one translational apparatus motion parameter,
   estimating an angle of the determined location of the audio source following the translational movement, and
   calculating, for the determined location of the audio source, the second offset based on the estimated angle and the type of translational movement.

8. The method as claimed in claim 7, wherein compensating for the translational movement comprises adjusting the estimated angle of the determined location of the audio source with the second offset.

9. The method as in claim 1, further comprising:
   determining from at least two video images associated with the at least one spatial audio signal a video image motion value, wherein deriving at least one of: the at least one rotational apparatus motion parameter, or the at least one translational apparatus motion parameter is based at least partially on the video image motion value.

10. An apparatus comprising:
    at least one processor, and
    at least one non-transitory memory including computer code for one or more programs, the at least one non-transitory memory and the computer code configured to with the at least one processor cause the apparatus to perform at least:
       capturing at least two sensor data, where the at least two sensor data are related to an audio source;
       determining a location of the audio source;
       determining from the at least two sensor data a device motion value;
       deriving, based at least partially on the device motion value, at least one of:
          at least one rotational apparatus motion parameter, or
          at least one translational apparatus motion parameter;
       determining at least one of: a first offset based on the at least one rotational apparatus motion parameter or a second offset based on the at least one translational apparatus motion parameter; and
       stabilizing at least one spatial audio signal, where the at least one spatial audio signal relates to the determined location of the audio source, based at least partially on at least one of:
          compensating for rotational movement of the apparatus based on the first offset, or
          compensating for translational movement of the apparatus based on the second offset.

11. The apparatus as in claim 10, wherein the apparatus is further caused to perform:
    presenting the stabilized at least one spatial audio signal to a user.

12. The apparatus as claimed in claim 10, wherein stabilizing the at least one spatial audio signal comprises applying the first offset and/or the second offset to the determined location of the audio source.

13. The apparatus as in claim 10, wherein deriving the at least one rotational apparatus motion parameter and/or the at least one translational apparatus motion parameter comprises filtering the at least one rotational apparatus motion parameter and/or the at least one translational apparatus motion parameter to remove higher frequency values.

14. The apparatus as in claim 10, wherein determining the first offset comprises estimating an amount of the rotational movement of the apparatus based on the at least one rotational apparatus motion parameter, and estimating an angle of the determined location of the audio source following the rotational movement.

15. The apparatus as in claim 14, wherein compensating for the rotational movement comprises applying the first offset to the estimated angle.

16. The apparatus as claimed in claim 10, wherein determining the second offset comprises:
    determining a type of the translational movement of the apparatus based on the at least one translational apparatus motion parameter,
    estimating an angle of the determined location of the audio source following the translational movement, and
    calculating, for the determined location of the audio source, the second offset based on the estimated angle and the type of translational movement.

17. The apparatus as claimed in claim 16, wherein compensating for the translational movement comprises adjusting the estimated angle of the determined location of the audio source with the second offset.

18. The apparatus as in claim 10, wherein the apparatus is further caused to perform:

determining from at least two video images associated with the at least one spatial audio signal a video image motion value, wherein deriving at least one of: the at least one rotational apparatus motion parameter, or the at least one translational apparatus motion parameter is based at least in part partially on the video image motion value.

19. A non-transitory computer-readable medium comprising computer program code that when executed with a computer causes the computer to perform:

capturing, with an apparatus, at least two sensor data, where the at least two sensor data are related to an audio source;

determining a location of the audio source;

determining from the at least two sensor data a device motion value;

deriving, based at least partially on the device motion value, at least one of:

at least one rotational apparatus motion parameter, or at least one translational apparatus motion parameter;

determining at least one of: a first offset based on the at least one rotational apparatus motion parameter or a second offset based on the at least one translational apparatus motion parameter; and stabilizing at least one spatial audio signal, where the at least one spatial audio signal relates to the determined location of the audio source, based at least partially on at least one of:

compensating for rotational movement of the apparatus based on the first offset, or compensating for translational movement of the apparatus based on the second offset.

20. The non-transitory computer-readable medium of claim 19, wherein the computer program code further causes the computer to perform:

presenting the stabilized at least one spatial audio signal to a user.

* * * * *

UNITED STATES PATENT AND TRADEMARK OFFICE
CERTIFICATE OF CORRECTION

PATENT NO.       : 10,448,192 B2
APPLICATION NO.  : 16/017079
DATED            : October 15, 2019
INVENTOR(S)      : Ravi Shenoy et al.

Page 1 of 1

It is certified that error appears in the above-identified patent and that said Letters Patent is hereby corrected as shown below:

In the Claims

In Claim 18:
Column 19, Line 8, "in part" should be deleted.

Signed and Sealed this
Twenty-sixth Day of November, 2019

Andrei Iancu
*Director of the United States Patent and Trademark Office*